(12) United States Patent
Shepherd et al.

(10) Patent No.: US 12,462,644 B2
(45) Date of Patent: Nov. 4, 2025

(54) FUNDING GAMING ESTABLISHMENT ACCOUNT WITH EXTERNAL ACCOUNT PAYMENT INSTRUMENT

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 373 days.

(21) Appl. No.: 18/081,380

(22) Filed: Dec. 14, 2022

(65) Prior Publication Data
US 2024/0203203 A1 Jun. 20, 2024

(51) Int. Cl.
*G07F 17/32* (2006.01)
*G06Q 20/10* (2012.01)
*G06Q 20/40* (2012.01)

(52) U.S. Cl.
CPC ....... *G07F 17/3241* (2013.01); *G06Q 20/105* (2013.01); *G06Q 20/4016* (2013.01); *G07F 17/3223* (2013.01)

(58) Field of Classification Search
CPC ............. G07F 17/3223; G07F 17/3225; G07F 17/3244; G07F 17/3251; G06Q 20/0655; G06Q 20/10; G06Q 20/204; G06Q 20/227; G06Q 20/34; G06Q 20/36
See application file for complete search history.

(56) References Cited

U.S. PATENT DOCUMENTS

| | | | |
|---|---|---|---|
| 6,394,907 B1 | 5/2002 | Rowe | |
| 6,866,586 B2 | 3/2005 | Oberberger et al. | |
| 6,876,971 B1 | 4/2005 | Burke | |
| 6,969,319 B2 | 11/2005 | Rowe et al. | |
| 7,419,428 B2 | 9/2008 | Rowe | |
| 7,536,349 B1 | 5/2009 | Mik et al. | |
| 7,722,466 B2 | 5/2010 | Rothschild | |
| 7,950,996 B2 | 5/2011 | Nguyen et al. | |
| 8,364,566 B2 | 1/2013 | Olliphant | |
| 8,484,127 B2 | 7/2013 | Olliphant | |
| 8,595,137 B2 | 11/2013 | Sears et al. | |
| 8,696,463 B2 | 4/2014 | Potts et al. | |
| 8,708,809 B2 | 4/2014 | Sanford et al. | |
| 8,734,236 B2 | 5/2014 | Arezina et al. | |
| 8,968,075 B2 | 3/2015 | Warner | |
| 8,998,708 B2 | 4/2015 | Sanford et al. | |
| 9,192,852 B2 | 11/2015 | Gagner et al. | |
| 9,196,123 B2 | 11/2015 | Sanford et al. | |
| 9,251,651 B2 | 2/2016 | Sanford et al. | |
| 9,293,002 B2 | 3/2016 | Richards et al. | |
| 9,466,176 B2 | 10/2016 | Sanford et al. | |
| 9,785,926 B2 | 10/2017 | Sanford et al. | |
| 10,360,761 B2 | 7/2019 | Higgins et al. | |
| 10,410,468 B1 | 9/2019 | Sanford et al. | |
| 10,417,866 B2 | 9/2019 | Nonaka | |
| 10,573,128 B2 | 2/2020 | Sanford et al. | |
| 10,631,164 B2 | 4/2020 | Yang et al. | |
| 10,713,893 B2 | 7/2020 | Sanford et al. | |
| 10,916,092 B2 | 2/2021 | Richards et al. | |
| 10,977,894 B2 | 4/2021 | Sanford et al. | |

(Continued)

*Primary Examiner* — Lawrence S Galka
(74) *Attorney, Agent, or Firm* — Neal, Gerber & Eisenberg LLP

(57) ABSTRACT

Systems and methods that enable indirect fund transfers between a gaming establishment account and an external account accessed in association with a payment instrument, such as a debit card.

20 Claims, 4 Drawing Sheets

(56) References Cited

U.S. PATENT DOCUMENTS

| | | |
|---|---|---|
| 11,062,562 B2 | 7/2021 | Shepherd et al. |
| 11,062,563 B2 | 7/2021 | Shepherd et al. |
| 11,164,420 B2 | 11/2021 | Shepherd et al. |
| 11,488,446 B2 | 11/2022 | Potts et al. |
| 2006/0064378 A1 | 3/2006 | Clementz et al. |
| 2007/0214080 A1* | 9/2007 | Babi .................. G06Q 20/108 705/42 |
| 2007/0244831 A1 | 10/2007 | Kuo |
| 2008/0113776 A1 | 5/2008 | Sommer |
| 2010/0227670 A1 | 9/2010 | Arezina et al. |
| 2011/0077073 A1 | 3/2011 | Gagner et al. |
| 2011/0086691 A1 | 4/2011 | Luciano, Jr. et al. |
| 2011/0246365 A1 | 10/2011 | Hogg et al. |
| 2011/0263318 A1 | 10/2011 | Agarwal et al. |
| 2012/0122584 A1 | 5/2012 | Nguyen |
| 2012/0271707 A1 | 10/2012 | Harrison et al. |
| 2012/0310778 A1 | 12/2012 | Paulsen et al. |
| 2012/0315984 A1 | 12/2012 | Carrico et al. |
| 2013/0073447 A1 | 3/2013 | Smith |
| 2013/0130781 A1 | 5/2013 | Anderson et al. |
| 2013/0317987 A1 | 11/2013 | Tsutsui |
| 2014/0057703 A1 | 2/2014 | Lestrange et al. |
| 2014/0080578 A1 | 3/2014 | Nguyen |
| 2014/0094284 A1 | 4/2014 | Sanford et al. |
| 2014/0235325 A1 | 8/2014 | Merati |
| 2014/0323206 A1 | 10/2014 | Gagner et al. |
| 2015/0012305 A1 | 1/2015 | Truskovsky et al. |
| 2015/0087408 A1 | 3/2015 | Siemasko et al. |
| 2015/0141125 A1 | 5/2015 | Lestrange et al. |
| 2015/0199868 A1 | 7/2015 | Kelly et al. |
| 2015/0235521 A1 | 8/2015 | Lutnick |
| 2015/0278819 A1 | 10/2015 | Song et al. |
| 2016/0292965 A1 | 10/2016 | Sanford et al. |
| 2017/0061438 A1 | 3/2017 | Patel |
| 2017/0091727 A1 | 3/2017 | Richards et al. |
| 2017/0092054 A1 | 3/2017 | Petersen et al. |
| 2018/0232720 A1 | 8/2018 | Robeen et al. |
| 2018/0268651 A1 | 9/2018 | Jones |
| 2019/0188956 A1 | 6/2019 | Higgins et al. |
| 2022/0068088 A1 | 3/2022 | Higgins et al. |
| 2022/0193557 A1 | 6/2022 | Higgins et al. |

\* cited by examiner

FUNDING GAMING ESTABLISHMENT ACCOUNT WITH EXTERNAL ACCOUNT PAYMENT INSTRUMENT

CROSS-REFERENCE TO RELATED APPLICATIONS

This application is related to the following commonly owned co-pending patent applications: U.S. application Ser. No. 18/081,400, entitled "FUNDING GAMING ESTABLISHMENT ACCOUNT WITH EXTERNAL ACCOUNT PAYMENT INSTRUMENT".

BACKGROUND

In various embodiments, the systems and methods of the present disclosure enable indirect fund transfers between a gaming establishment account and an external account accessed in association with a payment instrument, such as a debit card.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor responsive to a debit card initiated request to transfer an amount of funds to a gaming establishment account from an external account associated with a debit card, the instructions cause the processor to communicate, to a first server of a first financial institution, data associated with the amount of funds and data associated with the external account. In these embodiments, the external account is maintained in association with the first financial institution independent of any gaming establishment. When executed by the processor responsive to the first server of the first financial institution communicating an approval of the debit card initiated request to a second server of a second financial institution that maintains a backing financial institution account associated with a gaming establishment, the instructions cause the processor to cause a transfer of the amount of funds from the backing financial institution account associated with the gaming establishment to the gaming establishment account.

In certain embodiments, the present disclosure relates to a system including a processor, and a memory device that stores a plurality of instructions. When executed by the processor responsive to a debit card initiated request to transfer an amount of funds to a gaming establishment account from an external account associated with a debit card and an approval of the request, the instructions cause the processor to increase, based on the amount of funds, a balance of the gaming establishment account following an indirect transfer associated with a modification of a balance of a backing financial institution account associated with a gaming establishment. In these embodiments, following an occurrence of a settlement event and in association with a decrease of a balance of the external account, the balance of the backing financial institution account associated with the gaming establishment is increased.

In certain embodiments, the present disclosure relates to a method of operating a system. Responsive to a debit card initiated request to transfer an amount of funds to a gaming establishment account from an external account associated with a debit card, the method includes causing, by a processor, a communication to a first server of a first financial institution of data associated with the amount of funds and of data associated with the external account. In these embodiments, the external account is maintained in association with the first financial institution independent of any gaming establishment. Responsive to the first server of the first financial institution communicating an approval of the debit card initiated request to a second server of a second financial institution that maintains a backing financial institution account associated with a gaming establishment, the method includes causing a transfer of the amount of funds from the backing financial institution account associated with the gaming establishment to the gaming establishment account.

Additional features are described herein, and will be apparent from the following Detailed Description and the figures.

DETAILED DESCRIPTION

Figure 1:
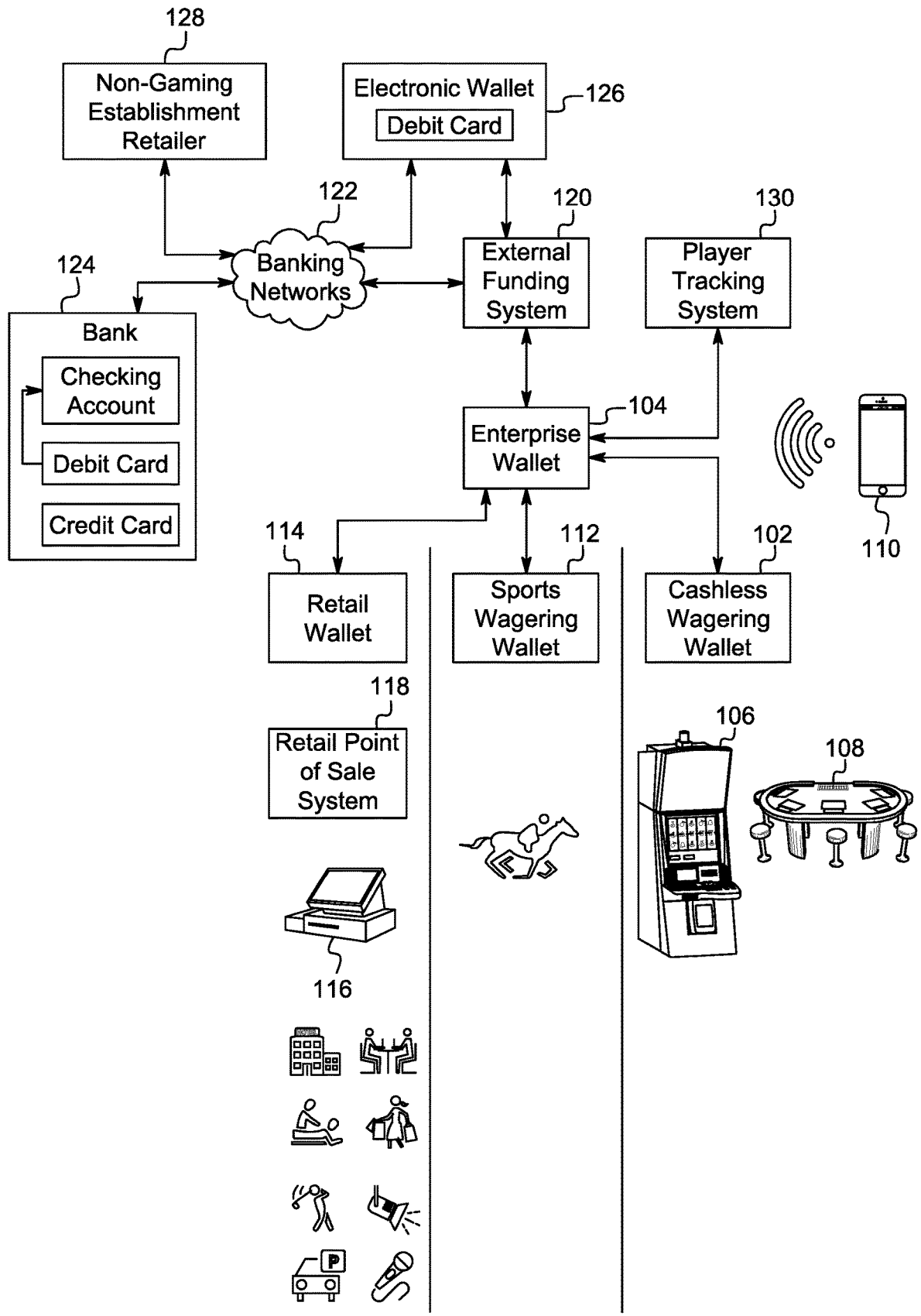
FIG. 1 is an example configuration of the architecture of a plurality of different components of the system of the present disclosure.

In various embodiments, the systems and methods of the present disclosure enable indirect fund transfers between a gaming establishment account and an external account accessed in association with a payment instrument, such as a debit card In certain embodiments, in association with the movement of funds between a gaming establishment account and an external account associated with a debit card issued by a financial institution, the system of the present disclosure utilizes a backing financial institution account for an initial transfer of funds from the source account coupled with the subsequent transfer of such funds to the destination account. As such, the system bypasses any direct transfer between the individual external account and the individual gaming establishment account and rather utilizes one or more backing financial institution accounts as one or more intermediate holding accounts for such funds. In other words, the present disclosure utilizes the settlement channel between financial institutions (e.g., a bank that backs the funds associated with one or more gaming establishment accounts and a bank that issues a debit card and that maintains funds associated with an external account associated with the debit card) to affect the movement of funds to and from a gaming establishment account, thereby avoiding a direct transfer into and/or from the gaming establishment account.

In certain embodiments in which funds are transferred from an external account associated with a user to a gaming establishment account, such as a cashless wagering account, associated with the user, one or more components of a financial institution system that maintains an external account associated with a debit card, such as a pre-paid debit card, operate with one or more components of a financial institution system that maintain a backing financial institution account associated with a gaming establishment fund management system. In these embodiments, the one or more components operate to enable a user to employ a debit card as an instrument to initiate a fund transfer from the external account and, subject to the transfer being approved, the one or more components of the financial institution system that maintains the external account operate to transfer (or otherwise approve a transfer for subsequent settlement upon an occurrence of a settlement event) an amount of funds from the external account to the backing financial institution account associated with the gaming establishment fund management system. Following this first transaction, one or more components of the financial institution system that maintains the backing financial institution account operate with one or more components of the gaming establishment fund management system to transfer (or otherwise approve a transfer for subsequent settlement upon an occurrence of a settlement event) the amount of funds from the backing financial institution account associated with the gaming establishment fund management system to the gaming establishment account maintained by the gaming establishment fund management system and associated with the user. Such a configuration provides that the debit card is not being used to transfer any funds directly into a gaming establishment account associated with a user. Rather, the debit card is employed to indirectly transfer funds into the gaming establishment account associated with the user by first modifying a balance of a backing financial institution account associated with a gaming establishment fund management system before modifying a balance of the gaming establishment account associated with the user.

In certain additional or alternative embodiments in which funds are transferred from a gaming establishment account, such as a cashless wagering account, associated with a user to an external account associated with the user, one or more components of a gaming establishment fund management system that maintains the gaming establishment account operate with one or more components of a financial institution system that maintains a backing financial institution account associated with the gaming establishment fund management system. In these embodiments, the one or more components of the gaming establishment fund management system enable a user to initiate a fund transfer to the external account (i.e., a withdrawal from the gaming establishment account) and, subject to the transfer being approved, the one or more components of the gaming establishment fund management system transfer (or otherwise approve a transfer for subsequent settlement upon an occurrence of a settlement event) an amount of funds to the backing financial institution account associated with the gaming establishment fund management system. Following this first transaction, the one or more components of the financial institution system that maintains the backing financial institution account operate with one or more components of the financial institution that maintain the external account associated with the debit card to transfer (or otherwise approve a transfer for subsequent settlement upon an occurrence of a settlement event) the amount of funds from the backing financial institution account to the external account. Such a configuration provides that the gaming establishment account is not being used to transfer any funds directly into any external account accessible with a debit card. Rather, the gaming establishment account is employed to indirectly transfer funds into the external account accessible with the debit card by first modifying a balance of a backing financial institution account before modifying a balance of the external account accessible with the debit card.

The system of the present disclosure thus provides an alternative, non-cash-based option for a gaming establishment patron to transfer funds to/from a gaming establishment account while complying with various anti-money laundering regulations which require the tracking of certain financial transactions associated with a gaming establishment patron. As such, to further expand the cashless ecosystem certain gaming establishments strive for, the system of the present disclosure enables a patron the opportunity to indirectly transfer funds between an external account accessible with a debit card and one or more gaming establishment accounts independent of any amount of cash and in compliance with certain anti-money laundering regulations.

It should be appreciated that since certain gaming establishment patrons are uncomfortable venturing into a gaming establishment with large amounts of cash, the system enables a user access to an amount of funds transferred from an external account without the need to handle cash. Such reduction in the use of cash at a gaming establishment provides a relatively more secure environment for a user (via reducing or eliminating a user carrying cash on their person and thus diminishing the risks that such cash may be lost or stolen), overcomes various health concerns associated with cash-based transactions (e.g., protecting patrons from using forms of currency that act as transmission vehicles for contagions), and benefits the gaming establishment by reducing the use of certain kiosks that accept cash (e.g., reducing the wear and tear on such devices and prolonging the operational life on these devices). Moreover, by reducing the amount of cash transactions in a gaming establishment via enabling the transfer of funds to/from one or more gaming establishment accounts, the system of the present disclosure reduces or eliminates human errors which often occur when cash is distributed at gaming establishment interfaces, such as casino desks and/or ticket vouchers are purchased with an amount of cash at gaming establishment interfaces, such as casino desks. Specifically, eliminating gaming establishment personnel from distributing cash and/or issuing ticket vouchers in exchange for amounts of cash not only protects the user (if the gaming establishment personnel provides the gaming establishment patron a lower amount of cash and/or a lower valued ticket voucher than the patron deserves) but also protects the gaming establishment (if the gaming establishment personnel inadvertently or fraudulently provides the patron a higher amount of cash and/or or a higher valued ticket voucher than the patron deserves).

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, individually or collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, funds held in zero, one or more of these cashless wagering accounts are accessible by (or otherwise configured to be accessible by upon one or more inputs from a user and/or gaming establishment personnel) a user.

In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic stripe card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic stripe card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, funds held in zero, one or more of these gaming establishment retail accounts are accessible by (or otherwise configured to be accessible by upon one or more inputs from a user and/or gaming establishment personnel) a user.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic stripe card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system includes or is otherwise in communication with one or more external funding sources which maintain one or more external accounts for the user. For example, as seen in FIG. 1, the gaming establishment fund management system that maintains the enterprise wallet 104 is in communication with an external funding system 120 which is in communication with a network of one or more banks or other financial institutions (i.e., the banking network 122) which operate to electronically transfer funds between the user's accounts maintained at such banks or financial institutions (i.e., bank 124 maintaining an external checking account associated with a debit card and/or a credit card) and one or more of the accounts maintained by the gaming establishment fund management system. As further seen in FIG. 1, in this example, the external funding system 120 is in communication (directly or indirectly via banking network 122) with an external electronic wallet 126 associated with a pre-paid debit card which operates to electronically transfer funds between the user's electronic wallet and one or more of the accounts maintained by the gaming establishment fund management system. In certain embodiments, funds maintained in the accounts of the external funding sources may be transferred to and/or from one or more accounts maintained by the gaming establishment fund management system. These accounts of the external funding sources include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any system or sub-system of the present disclosure can be in communication with one or more external funding sources. In different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to facilitate the transfer of funds to/from an external account.

In certain instances, the balance of one or more gaming establishment accounts are modified via transactions initiated by a debit card and accessible at a point-of-contact external from any gaming establishment channel of commerce (e.g., a non-gaming establishment retailer 128 in communication, via the banking network 122, with at least the bank 124). In certain instances, the balance of one or more gaming establishment accounts are additionally or alternatively modified via transactions initiated by a debit card and accessible at a point-of-contact within a gaming establishment channel of commerce (e.g., the retail point-of-sale system 118). In certain instances, the balance of one or more gaming establishment accounts are additionally or alternatively modified via transactions initiated by a debit card and accessible at a gaming device (e.g., an EGM 106 and/or a gaming table 108).

In certain embodiments, the gaming establishment fund management system is in communication with one or more gaming establishment patron management systems (e.g., player tracking system 130) that monitor activities at various points of contact associated with the gaming establishment and provides rewards, such as redeemable player tracking points, in association with such activities. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk or terminal, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments (not shown), the gaming establishment fund management system is in communication with one or more credit systems which each issue the user one or more lines of credit. These lines of credit are accessible to facilitate a transfer of funds from the line of credit issued by the credit system to (either directly or indirectly through a cashless wagering account) a credit balance of a gaming device, such as an EGM and/or a gaming table and/or to (either directly or indirectly through a gaming establishment retail account) a point-of-sale terminal (or an account associated with the point-of-sale terminal). It should be appreciated that the gaming establishment fund management system may be in communication with one or more credit systems, and in different embodiments, any system or sub-system of the present disclosure can be in communication with one or more credit systems. It should be further appreciated that in different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment credit system.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while, in certain embodiments, the gaming establishment fund management system being in communication with one or more credit reporting networks and one or more credit reporting/credit risk systems, in different embodiments, any system or sub-system of the present disclosure can be in communication with one or more credit reporting/credit risk systems.

In certain embodiments (not shown), the gaming establishment fund management system includes a debit card issuer system. In certain other embodiments, the gaming establishment fund management system is additionally or alternatively in communication with an external debit card issuer system. In these embodiments, the debit card issuer system issues one or more debit cards for a user. For example, the gaming establishment fund management system that maintains the enterprise wallet is in communication with a debit card issuer system to facilitate the access of an amount of funds held in one or more gaming establishment accounts via a debit card provided to the user. In this example, the network of one or more banks or other financial institutions is in communication with the debit card issuer system to facilitate at least the settlement of funds held in one or more gaming establishment accounts accessed via a debit card provided to the user. In certain embodiments, the debit card is independent of any underlying account maintained at any financial institution. Rather, such a debit card operates as an interface to enable a user access to funds held in one or more gaming establishment accounts of the gaming establishment fund management system at one or more channels of commerce associated with the gaming establishment and/or independent of the gaming establishment. In certain other embodiments, the debit card is associated with an account that operates to enable a user just-in-time access to funds held in one or more gaming establishment accounts of the gaming establishment fund management system at one or more channels of commerce associated with the gaming establishment and/or independent of the gaming establishment. It should be appreciated that while illustrated as the gaming establishment fund management system being in communication with one or more debit card issuer systems, in different embodiments, any system or sub-system of the present disclosure can be in communication with one or more debit card issuer systems. It should be further appreciated that in different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the debit card issuer system.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, a gaming device (e.g., an interface of an EGM or gaming table component), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic stripe card may additionally or alternatively be utilized to enable a user access to such gaming establishment accounts.

In certain embodiments, the system enables a transfer of funds between different accounts maintained by different components associated with different gaming activities and/or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In various embodiments, prior to transferring funds associated with an external account maintained by an external funding source to/from a backing financial institution account associated with a gaming establishment fund management system and then to/from one or more gaming establishment accounts, the user enrolls or otherwise associates an external account maintained by an external funding source. In certain embodiments, if the user has not previously enrolled the external account and/or the external funding source with one or more components of the gaming establishment fund management system, the system enables the user to enroll the external account and/or the external funding source with the gaming establishment fund management system. For example, the system of the present disclosure enables a user to enroll a bank account with the gaming establishment fund management system using a mobile device application. In certain instances, such enrollment occurs independent of requiring the user to logon to the mobile device application or otherwise identify themselves to a gaming establishment patron management system. In these instances, the user remains anonymous to the gaming establishment because the act of enrolling the bank account maintained by the bank is between the user, the mobile device application and the user's bank.

In various embodiments, to enroll an external account and/or an external funding source with a gaming establishment fund management system, the system enables a user to utilize an interface, such as a mobile device application being executed by a mobile device, a website accessed from a browser, a kiosk and/or a service window displayed by EGM (or other gaming establishment device), to attempt to complete the enrollment through one or more interactive forms. For example, as part of enrolling an external account and/or an external funding source with a gaming establishment fund management system, the user makes one or more inputs via an interface to provide certain user identifying information (such as, but not limited to, name, address, birthdate, state of birth, additional address details, a social security number and/or a mother's maiden name) and/or certain external account identifying information (such as, but not limited to, an identification of a funding source, an external account number, a unique username/password combination associated with the user to access the external account).

In certain embodiments, as part of enrolling an external account and/or an external funding source with a gaming establishment fund management system, the gaming establishment fund management system determines zero, one or more security measures to invoke in association with one or more (or each) transaction that involves funds transferred to/from the external account. In these embodiments, to prevent unauthorized access to the funds associated with such an external account, the system applies such determined security measures in association with one or more (or each) transaction that attempts to transfer funds to/from the external account. In certain embodiments, as part of enrolling an external account and/or an external funding source with a fund management system, the gaming establishment fund management system determines one or more controls or restrictions to associate with the external account wherein if such controls are violated, the gaming establishment fund management system invokes one or more security measures. In these embodiments, to balance the need to prevent unauthorized access to the funds associated with an external account against the need to provide a frictionless experience for users, the gaming establishment fund management system dynamically employs one or more security measures such that certain transactions that trigger the need employ enhanced security measures and certain transactions that do not trigger the need do not employ enhanced security measures. It should be appreciated that an enhanced security measure includes any form of security that was not otherwise associated with the transaction prior to the determination that the nature of the transaction warranted an additional degree of protection to combat any attempted fraud associated with the transaction. For example, if a user is required to enter a personal identification number ("PIN") for each attempted transfer of funds to/from an external account regardless of any determination that the nature of the transaction warrants any additional degree of protection to combat any attempted fraud associated with the transaction, such a PIN would not qualify as an enhanced security measure. In another example, if a user is not required to enter a PIN for each attempted transfer of funds to/from an external account but following a determination that the nature of the transaction warrants requiring the user to enter a personal identification number as an additional degree of protection to combat any attempted fraud associated with the transaction, such a PIN would qualify as an enhanced security measure. In certain embodiments, the external account is associated with a transaction completion time (i.e., an amount of time a financial institution associated with the external account needs to approve or disapprove the fund transfer and make the amount of funds available). As such, since different external accounts are associated with different transaction completion times, the user may enroll different external accounts and utilize the funds from different external accounts at different points in time based on the respective transaction completion times of these different external accounts.

In certain embodiments, following the enrollment of an external funding source and/or an external account associated with a user and prior to utilizing any funds maintained in a gaming establishment account, an amount of funds must first be established or otherwise deposited in the gaming establishment account, such as a gaming establishment fund management account, a cashless wagering account and/or a gaming establishment retail account. In other words, prior to the system enabling the use of funds associated with a gaming establishment account, an amount of funds must first be deposited in or otherwise transferred to the gaming establishment account.

In certain embodiments, responsive to the user indicating an amount of funds to transfer from the external account associated with the debit card and maintained by the external funding source to the gaming establishment account associated with the user, the system initiates a requested transfer of funds from the external funding source.

Figure 2:
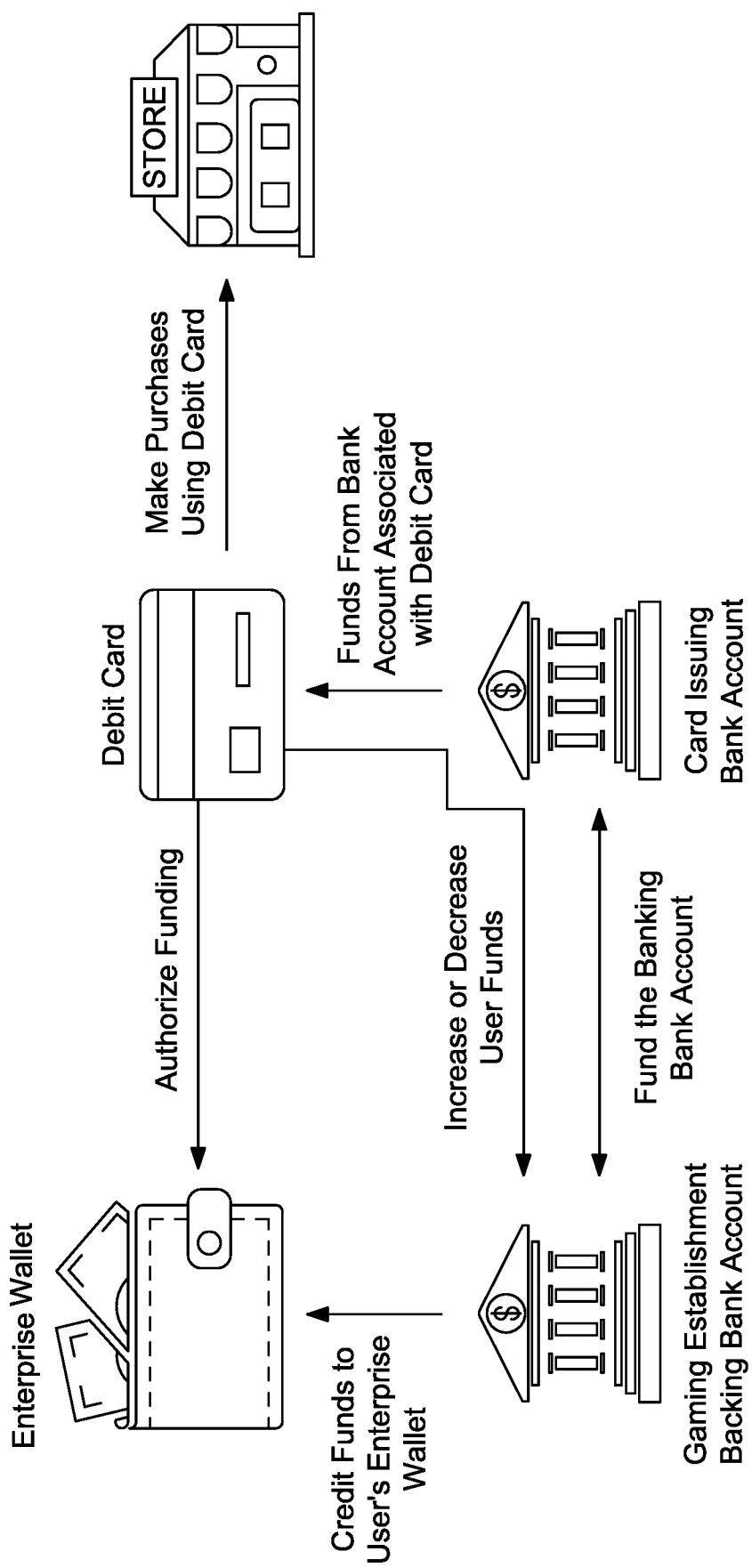
FIG. 2 is a flow chart of an example process for operating a system including various components that orchestrate the transfers of funds between an external account associated with a debit card, a gaming establishment account and a backing financial institution account associated with a gaming establishment fund management system.

In certain embodiments, responsive to a user requesting a transfer of funds from an external account associated with a debit card, such as a pre-paid debit card, one or more components of a financial institution system that maintains the external account operate with one or more components of a financial institution system that maintain a backing financial institution account associated with a gaming establishment fund management system. In these embodiments, subject to the transfer being approved, the one or more components of the financial institution system that maintains the external account operate to transfer (or otherwise approve a transfer for subsequent settlement upon an occurrence of a settlement event) an amount of funds from the external account to the backing financial institution account associated with the gaming establishment fund management system. Following this first transaction, one or more components of the financial institution system that maintains the backing financial institution account operate with one or more components of the gaming establishment fund management system to transfer (or otherwise approve a transfer for subsequent settlement upon an occurrence of a settlement event) the amount of funds from the backing financial institution account associated with the gaming establishment fund management system to the gaming establishment account maintained by the gaming establishment fund management system and associated with the user. In certain such embodiments wherein the transfer of funds between financial institutions occurs responsive to a settlement event, upon a successful settlement of the transfer of funds from the external account, such as upon a successful settlement of funds received from a banking account via an automated clearing house ("ACH") transfer, the components of the financial institution systems that maintain the backing financial institution account and the external account operate to facilitate the transfer of such funds between the different financial institution accounts. Accordingly, as seen in FIG. 2, in various embodiments, in addition to employing a debit card to conduct transactions within or external to gaming establishments channels of commerce (i.e., the store), different components of different systems operate together to enable a transfer of funds from a financial institution that maintains an external account associated with a user (i.e., the card issuing bank account associated with a debit card) to a financial institution that maintains a backing financial institution account associated with a gaming establishment fund management system (i.e., the gaming establishment backing bank account) and then to a gaming establishment fund management account associated with the user (e.g., the enterprise wallet).

In certain embodiments, the system employs a kiosk or terminal that a user interfaces with to log into an enrolled external account maintained by the external funding source (and/or log into the gaming establishment fund management system in communication with the external funding source) and transact with the external funding system. In these embodiments, the external funding system transacts with the banking network interface system which transacts with the gaming establishment fund management system to transfer funds (or otherwise approve a transfer for subsequent settlement upon an occurrence of a settlement event) from the external account to the backing financial institution account associated with the gaming establishment fund management system and then to the gaming establishment account. In certain embodiments that operate independent of any kiosk or terminal, the system enables the user to log into an enrolled external account maintained by the external funding source (and/or log into the gaming establishment fund management system in communication with the external funding source) via utilizing a mobile device application that transacts with the external funding system. In these embodiments, the external funding system transacts with the banking network interface system which transacts with the gaming establishment fund management system to transfer funds (or otherwise approve a transfer for subsequent settlement upon an occurrence of a settlement event) from the external account to the backing financial institution account associated with the gaming establishment fund management system and then to the gaming establishment account. It should be appreciated that in different embodiments, in addition to or alternatively from utilizing a mobile device running a mobile device application and/or a kiosk or terminal to access funds from an external account, the system utilizes an EGM, a remote host controlled service window displayed by an EGM, a display device/input device associated with a seat-level gaming table component, a display device/input device associated with a table-level gaming table component, and/or a display device/input device associated with a mobile gaming table component to access such funds.

In certain embodiments wherein a kiosk or terminal is employed to indirectly transfer funds from an external account to a gaming establishment account associated with a user, such as a cashless wagering account, the kiosk enables the user to input data for accessing the external account and/or information regarding the amount of the transfer using one or more input devices of the kiosk, such as inserting a debit card and inputting a PIN via a PIN pad of the kiosk. In certain other embodiments wherein a kiosk is employed to indirectly transfer funds from an external account to a gaming establishment account associated with a user, such as a cashless wagering account, the kiosk receives certain data for accessing the external account and/or information regarding the amount of the transfer from a mobile device associated with the user. In these embodiments, following the launching of the mobile device application, such as following the user selecting an image associated with the account stored via a digital wallet application or following the mobile device application retrieving data associated with an account stored via a digital wallet application, the mobile device application prompts the user to cause the mobile device to engage the kiosk, such as prompting the user to tap the mobile device to a card reader or other designated location(s) of the kiosk. After such engagement (or after the launching of the mobile device application if no mobile device to kiosk engagement is required), the mobile device application communicates, via a wireless communication protocol, data for accessing the external account stored by the mobile device to the kiosk. In different embodiments, such data is communicated from the mobile device to the kiosk via one or more wireless communication protocols including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol). It should be appreciated that in different embodiments, the data for accessing the external account includes data identifying the external account and/or data identifying the user, such as, but not limited to, an identification of a funding source, an external account number, a unique username/password combination associated with the user to access the external account, biometric data received by a biometric sensor (e.g., a fingerprint sensor, a retinal sensor, a voice sensor, or a facial-recognition sensor) of the mobile device and/or the kiosk, and/or any other suitable identifying information.

Following the kiosk receiving the data for accessing the external account (either from the mobile device, a server in communication with the mobile device, or from the user independent of the mobile device, such as via the kiosk reading information from the debit card associated with the external account), the kiosk of this embodiment proceeds with operating with one or more components that operate to log the user into the external account to initiate any transfers of funds from such an external account. That is, to transfer funds from an external account associated with a debit card in accordance with various embodiments of the present disclosure, a user interfaces with one or more components of an external funding source to request an amount of funds. For example, following a debit card initiated transfer transaction, the kiosk communicates data regarding the requested transfer of funds to one or more servers of a financial institution that maintains the external account. Such data includes, but is not limited to, an amount of the requested transfer transaction, account identifying information (e.g., a banking account number associated with the debit card), account verifying information (e.g., a PIN associated with the banking account), and/or user identifying information. In this example, the one or more servers of the financial institution determine whether or not to authorize the requested transfer of funds. That is, the financial institution that maintains the external account associated with the debit card determines whether or not to authorize access to the requested amount of funds from the external account associated with the debit card.

If the determination is to not authorize the requested transfer of funds (i.e., the external account lacks adequate funds to cover the requested transfer and/or the requested transfer is otherwise in violation of one or more rules and regulations), the one or more servers of the financial institution denies the requested transfer of funds and communicates data of the denied transfer to the kiosk and/or the mobile device to display one or more denied transfer messages to the user.

On the other hand, if the determination is to authorize the requested transfer of funds (i.e., the external account has adequate funds to cover the transfer and the requested transfer is otherwise in compliance with zero, one or more rules and regulations), the one or more servers of the financial institution escrow the funds and communicates data associated with the authorization of the transfer to one or more servers of a financial institution that maintains a backing financial institution account associated with the gaming establishment fund management system. The one or more servers of the financial institution that maintains the backing financial institution account associated with the gaming establishment fund management system then communicate data to one or more servers of the gaming establishment fund management system authorizing the transfer. Responsive to receipt of data authorizing the transfer, the one or more servers of the gaming establishment fund management system modifies the balance of the gaming establishment account to reflect the amount of funds indirectly transferred from the external account associated with the debit card to the gaming establishment account.

Figure 3:
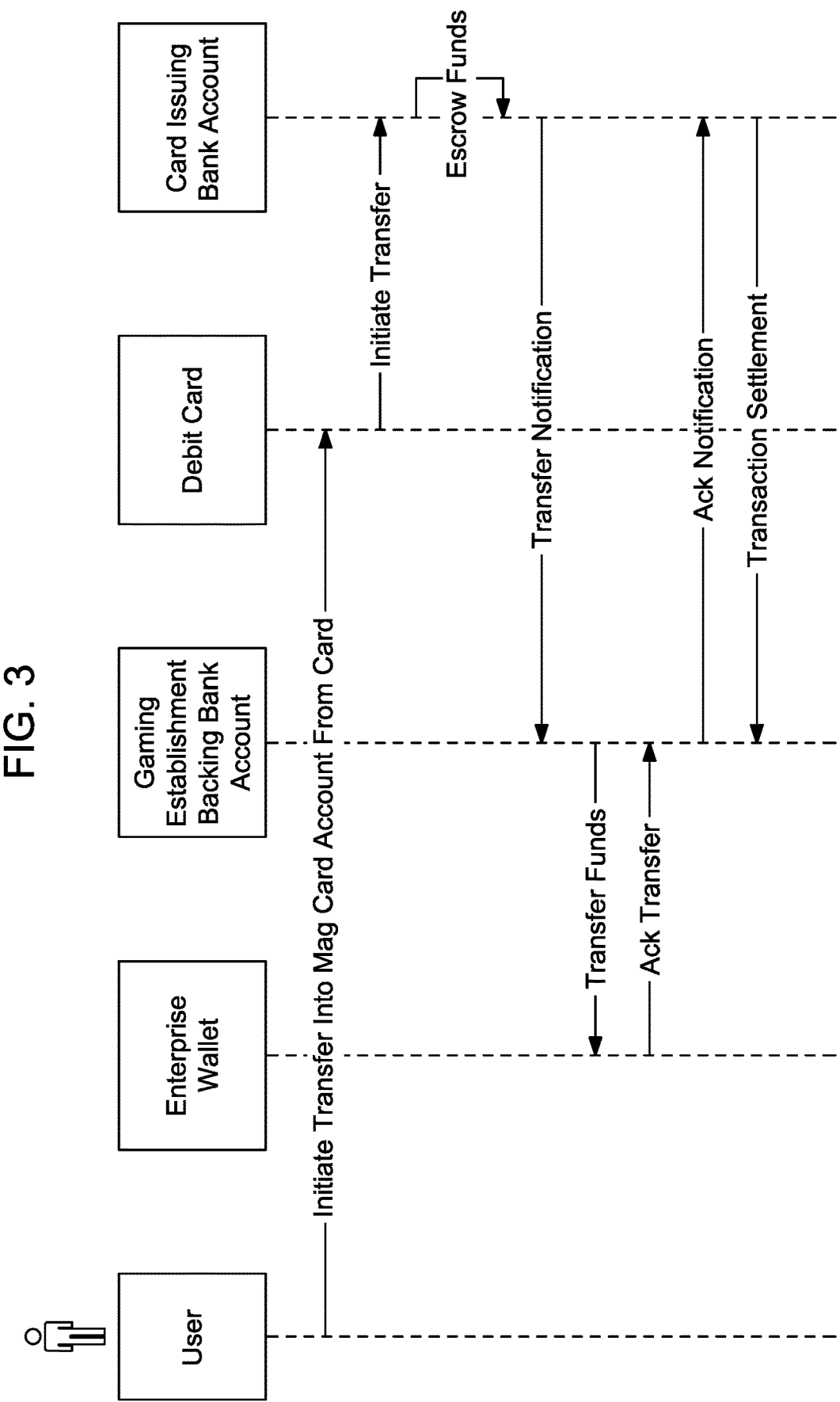
FIG. 3 is a flow chart of an example process for operating a system which enables funds to be transferred indirectly from an external account associated with a debit card to a gaming establishment account.

Accordingly, in various embodiments, the system of the present disclosure enables a debit card to be used to access funds in an external account to potentially cause an indirect transfer of funds to a gaming establishment account. For example, as seen in FIG. 3 (which illustrates the described interactions between the user, the gaming establishment fund management system, the financial institutions that maintains an account associated with the gaming establishment fund management system and the financial institution that maintains the external account associated with the debit card), certain embodiments of using a debit card to indirectly transfer funds to a gaming establishment account include presenting the debit card associated with an external account to initiate the transfer transaction and responsive to the initiation of the transfer transaction, the financial institution that maintains the backing financial account associated with the gaming establishment fund management system (i.e., the gaming establishment backing bank account) interfaces with the financial institution that maintains the external account associated with the debit card (i.e., the card issuing bank account) to approve or deny the transfer of funds to the backing financial institution account associated with the gaming establishment fund management system. As seen in FIG. 3, if the transfer is approved, a transfer notification is communicated to the backing financial institution account associated with the gaming establishment fund management system which then operates with the gaming establishment fund management system to cause a transfer of funds to the gaming establishment account. It should be appreciated that in this example, funds associated with the debit card are not directly transferred into the gaming establishment account associated with the user. Rather, funds associated with the debit card are initially transferred (or otherwise approved to transfer for subsequent settlement upon an occurrence of a settlement event) to a gaming establishment backing financial institution account and the gaming establishment fund management system subsequently interfaces with the system that maintains the gaming establishment backing financial institution account to facilitate the transfer (or otherwise approval of a transfer for subsequent settlement upon an occurrence of a settlement event) of such funds to the gaming establishment account associated with the user.

In certain additional or alternative embodiments, responsive to the user indicating an amount of funds to transfer from a gaming establishment account to an external account associated with a debit card and maintained by the external funding source, the system initiates a requested transfer of funds from the gaming establishment account. In certain embodiments, responsive to a user requesting a transfer of funds to an external account from a gaming establishment account, one or more components of a gaming establishment fund management system that maintains the gaming establishment account operate with one or more components of a financial institution system that maintains the backing financial institution account associated with the gaming establishment fund management system. In these embodiments, subject to the transfer being approved, the one or more components of the gaming establishment fund management system transfer (or otherwise approve a transfer for subsequent settlement upon an occurrence of a settlement event) an amount of funds to the backing financial institution account associated with the gaming establishment fund management system. Following this first transaction, the one or more components of the financial institution system that maintains the backing financial institution account operate with one or more components of the financial institution that maintain the external account associated with the debit card to transfer (or otherwise approve a transfer for subsequent settlement upon an occurrence of a settlement event) the amount of funds from the backing financial institution account to the external account. In certain such embodiments wherein the transfer of funds between financial institutions occurs responsive to a settlement event, upon a successful settlement of the transfer of funds to the external account, such as upon a successful settlement of funds received by a banking account via ACH transfer, the components of the financial institution systems that maintain the backing financial institution account and the external account operate to facilitate the transfer of such funds between the different financial institution accounts. Accordingly, as seen in FIG. 2, in various embodiments, in addition to employing a debit card to conduct transactions within or external to gaming establishments channels of commerce (i.e., the store), different components of different systems operate together to enable a transfer of funds from a gaming establishment fund management account associated with the user (e.g., the enterprise wallet) to a financial institution that maintains a backing financial institution account associated with a gaming establishment fund management system (i.e., the gaming establishment backing bank account) and then to a financial institution that maintains an external account associated with a user (i.e., the card issuing bank account associated with a debit card).

In certain embodiments, the system employs a kiosk or terminal that a user interfaces with to log into a gaming establishment fund management system and transact with the gaming establishment fund management system to facilitate a transfer of funds to an external account. In these embodiments, the gaming establishment fund management system transacts with the banking network interface system which transacts with the backing financial institution account associated with the gaming establishment fund management system to transfer funds (or otherwise approve a transfer for subsequent settlement upon an occurrence of a settlement event) from the gaming establishment account to the backing financial institution account associated with the gaming establishment fund management system and then to the external account. In certain embodiments that operate independent of any kiosk or terminal, the system enables a user to log into a gaming establishment fund management system and transact with the gaming establishment fund management system to facilitate a transfer of funds to an external account via utilizing a mobile device application that transacts with the gaming establishment fund management system. In these embodiments, the gaming establishment fund management system transacts with the banking network interface system which transacts with the backing financial institution account associated with the gaming establishment fund management system to transfer funds (or otherwise approve a transfer for subsequent settlement upon an occurrence of a settlement event) from the gaming establishment account to the backing financial institution account associated with the gaming establishment fund management system and then to the external account. It should be appreciated that in different embodiments, in addition to or alternatively from utilizing a mobile device running a mobile device application and/or a kiosk or terminal to access funds from a gaming establishment account, the system utilizes an EGM, a remote host controlled service window displayed by an EGM, a display device/input device associated with a seat-level gaming table component, a display device/input device associated with a table-level gaming table component, and/or a display device/input device associated with a mobile gaming table component to access such funds.

In certain embodiments wherein a kiosk or terminal is employed to indirectly transfer funds from a gaming establishment account, such as a cashless wagering account, to an external account, the kiosk enables the user to input data for accessing the gaming establishment account, data for interfacing with the external account and/or information regarding the amount of the transfer using one or more input devices of the kiosk, such as inserting a debit card and inputting a PIN via a PIN pad of the kiosk. In certain other embodiments wherein a kiosk is employed to indirectly transfer funds from a gaming establishment account, such as a cashless wagering account, to an external account, the kiosk receives, as described above in relation to an indirect transfer of funds from an external account to the gaming establishment account, certain data for accessing the external account and/or information regarding the amount of the transfer from a mobile device associated with the user.

Following the kiosk receiving the data for accessing the gaming establishment account and/or interfacing with the external account (either from the mobile device, a server in communication with the mobile device, or from the user independent of the mobile device, such as via the kiosk reading information from the debit card associated with the external account), the kiosk of this embodiment proceeds with operating with one or more components of the gaming establishment fund management system to log the user into the gaming establishment account to initiate any transfers of funds from such an account. In these embodiments, to transfer funds to an external account associated with a debit card in accordance with various embodiments of the present disclosure, one or more components of the gaming establishment fund management system operate or otherwise interface with one or more components of a financial institution that maintains a backing financial institution account associated with the gaming establishment fund management system to first transfer funds (or otherwise approve a transfer for subsequent settlement upon an occurrence of a settlement event) to the backing financial institution account and then transfer funds (or otherwise approve a transfer for subsequent settlement upon an occurrence of a settlement event) to the external funding source. For example, following a debit card initiated transfer transaction, the one or more servers of the gaming establishment fund management system determine whether or not to authorize the requested transfer of funds. That is, the gaming establishment fund management system determines whether or not to authorize the indirect transfer of the requested amount of funds from the gaming establishment account to the external account associated with the debit card.

If the determination is to not authorize the requested transfer of funds (i.e., the gaming establishment account lacks adequate funds to cover the requested transfer and/or the requested transfer is otherwise in violation of one or more rules and regulations), the one or more servers of the gaming establishment fund management system denies the requested transfer of funds and communicates data of the denied transfer to the kiosk and/or the mobile device to display one or more denied transfer messages to the user.

On the other hand, if the one or more servers of the gaming establishment fund management system authorize the requested transfer of funds (i.e., the gaming establishment account includes adequate funds to cover the requested transfer and the requested transfer is not otherwise in violation of one or more rules and regulations), one or more servers of the gaming establishment fund management system communicate data regarding the transfer of funds to one or more servers of a financial institution that maintains the backing financial institution account associated with the gaming establishment fund management system. Such data includes, but is not limited to, an amount of the requested transfer transaction, account identifying information (e.g., a banking account number associated with the debit card), account verifying information (e.g., a PIN associated with the banking account), and/or user identifying information.

In certain embodiments, the one or more servers of the financial institution that maintains the backing financial institution account associated with the gaming establishment then communicate data associated with the approved transfer to the one or more servers of the financial institution that maintains the external account. Responsive to receipt of data authorizing the transfer, the servers of the financial institution that maintains the external account modify the balance of the external account to reflect the amount of funds indirectly transferred from the gaming establishment account to the external account associated with the debit card.

Figure 4:
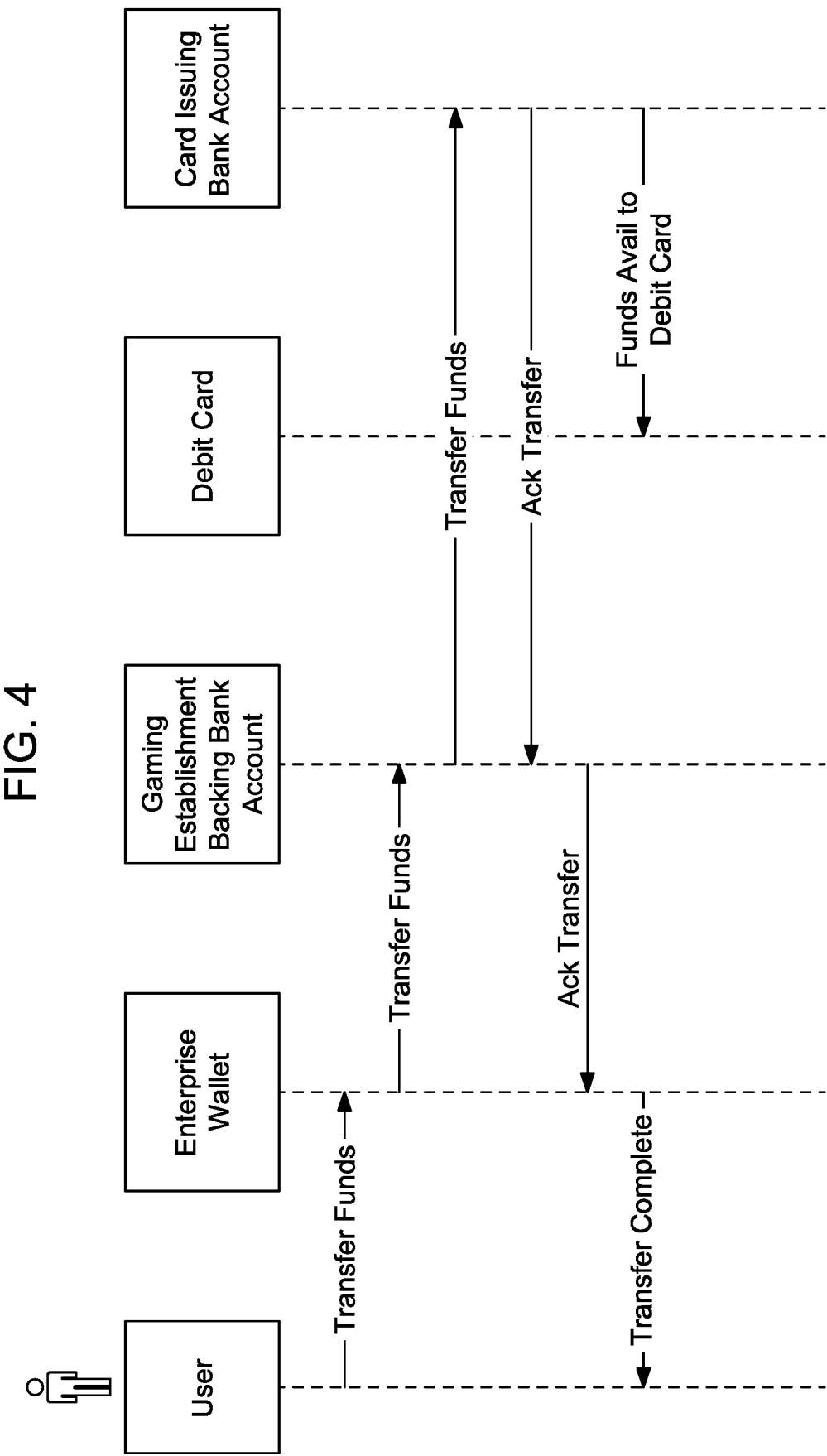
FIG. 4 is a flow chart of an example process for operating a system which enables funds to be transferred indirectly from a gaming establishment account to an external account associated with a debit card.

Accordingly, in various embodiments, the system of the present disclosure enables a debit card to be used to withdraw funds from a gaming establishment account and indirectly transfer such funds to an external account. For example, as seen in FIG. 4 (which illustrates the described interactions between the user, the gaming establishment fund management system, the financial institutions that maintains an account associated with the gaming establishment fund management system and the financial institution that maintains the external account associated with the debit card), certain embodiments of using a debit card to indirectly transfer funds from a gaming establishment account to an external account includes presenting the debit card associated with an external account to initiate the transfer transaction and responsive to the initiation of the transfer transaction, the gaming establishment fund management system (i.e., the enterprise wallet) approving or denying the transfer of funds to the backing financial account associated with the gaming establishment fund management system. As seen in FIG. 4, if the transfer is approved and subject to a settlement event (not shown), a transfer notification is communicated to the backing financial institution account associated with the gaming establishment fund management system which then operates with the financial institution that maintains an external account associated with the debit card (i.e., the card issuing bank account) to subsequently transfer the funds to the external account. It should be appreciated that in this example, funds associated with the gaming establishment associated with the user are not transferred directly to the external account associated with the debit card. Rather, funds associated with the gaming establishment account are initially transferred (or otherwise approved to transfer for subsequent settlement upon an occurrence of a settlement event) to a gaming establishment backing financial institution account and the system that maintains the gaming establishment backing financial institution account subsequently interfaces with the system that maintains the external account associated with the debit card to facilitate the transfer (or otherwise approval of a transfer for subsequent settlement upon an occurrence of a settlement event) of such funds to the external account associated with the debit card.

It should be appreciated that while the indirect transfer of funds between an external account associated with a debit card and a gaming establishment account includes the gaming establishment fund management system modifying the balance of the gaming establishment account based on such a debit card facilitated transfer, the settlement of such funds between the external account and the financial institution account associated with the gaming establishment fund management system occurs upon a settlement event. Such a settlement event occurs automatically at a preset interval or point in time, automatically in real time, and/or responsive to one or more inputs received to initiate the settlement event. In these embodiments, upon an occurrence of the settlement event, the financial institution associated with the gaming establishment fund management system operates with a financial institution that maintains the external account to cause a transfer of an amount of funds between the external account and the financial institution account associated with the gaming establishment fund management system. In these embodiments, since certain jurisdictions require that the amount of funds associated with one or more gaming establishment accounts maintained by a gaming establishment fund management system for one or more users are secured by a corresponding amount of funds in one or more backing financial institution accounts for the gaming establishment, to account for the debit card facilitated transfer of funds flowing to and/or from such a gaming establishment account, the system causes, either in association with each debit card facilitated transaction or in association with a plurality of debit card facilitated transactions, the transfer of funds between the financial institution account associated with the gaming establishment fund management system and the external account associated with the debit card. Such settlement transfers ensure that the amounts maintained in the gaming establishment account maintained by the gaming establishment fund management system comply with jurisdictional requirements by corresponding with the amounts maintained in the one or more associated financial institution accounts.

In certain embodiments, the settlement event occurs in lockstep with the overall transaction such that the settlement of funds between different financial institution accounts automatically occurs in association with the indirect transfers of funds between the gaming establishment account and the external account. In certain other embodiments, a delay occurs between the modification of the balance of the gaming establishment account and the settlement of funds between different financial institution accounts such that the systems employ certain data to ensure that when the settlement event occurs, the correct funds are transferred to the correct financial institution accounts.

In certain such embodiments wherein a delayed settlement event occurs and the backing financial institution account associated with the gaming establishment fund management system is associated with a plurality of per user custodial accounts (i.e., one custodial account per user that is associated with the backing financial institution account), the system interfacing with the financial institution that maintains the backing financial institution account associated with the gaming establishment fund management system is responsible for coordinating that any transferred funds reach the correct custodial account associated with the correct user. In certain other such embodiments wherein a delayed settlement event occurs and the backing financial institution account associated with the gaming establishment fund management system is an aggregated account for all user deposits associated with the gaming establishment fund management system, the system interfacing with the financial institution that maintains the backing financial institution account associated with the gaming establishment fund management system is responsible for coordinating that any transferred funds reach the correct destination account. In these different embodiments, to facilitate the transfer, one or more components of one or more systems require information in the transfer that identifies or associates the transfer with one or more backing financial institution accounts associated with the gaming establishment fund management system. For example, to accommodate the coordination for transfers initiated by the external account, the data communicated between the different components include one or more user identifiers and/or user account identifiers with the transfer, such as a reference to the destination user's gaming establishment identification (associated with a player tracking account associated with a gaming establishment fund management system patron management system) and/or a reference to one or more player tracking card numbers associated with the user's player tracking account. In another embodiment, to support batching of transfers, the transfer transaction contains an amount associated with more than one user such that the combined transfer transaction not only references each user associated with the overall transaction (using one or more of the user identifiers and/or suer account identifiers), the transfer transaction also references the sub-set of the overall transfer amount that is associated with each referenced user.

In certain embodiments, one or more components of one or more systems associated with the indirect transfer of funds apply certain money laundering detections and notifications, including detecting certain structured transactions. In these embodiments, since the ability to transfer funds between an external account and funds deposited into a gaming establishment account creates potential money laundering risks (e.g., a user could solely fund their gaming establishment account using illicit cash at an EGM, then transfer those funds back to their gaming establishment account and later transfer such funds to an external banking account and/or a user could transfer illicit funds electronically into their gaming establishment account and then transfer such funds to an external banking account), the system of the present disclosure detects these scenarios, and potentially blocks them and/or reports them by providing the appropriate information that must be filed with financial crimes regulators in a given jurisdiction.

In one such embodiment, the gaming establishment fund management system prevents a user from the described indirect transfers of funds to an external account if the funds transferred or deposited into the gaming establishment account have not been transferred to an EGM and/or a gambling touchpoint on a gaming establishment floor. In another such embodiment, the gaming establishment fund management system tracks funds that were deposited into an EGM (via cash or an instrument unaffiliated with a user, such as a ticket voucher) but were not wagered. In this embodiment, upon receipt of this information (that is, some transfer of funds into the user's gaming establishment account), the system restricts or prevents the user from the described indirect transfers of funds to an external account until those funds have been wagered with.

In certain additional or alternative embodiments, one or more components of the gaming establishment fund management system reports on certain attempted indirect transfers of funds to an external account. In one such embodiment, the system detects that a user has initiated an indirect transfer (or a set of indirect transfers) that at least reaches a regulatory reporting limit, and then the system notifies the operator that a regulatory report needs to be filed. Such an embodiment enables gaming establishment personnel the ability to have the appropriate information to file one or more suspicious activity reports with financial crimes regulatory agencies, such as the US Treasury's FinCEN. In another embodiment, the system facilitates the automatic filing of a regulatory report on behalf of the operator, such as automatically filling in the appropriate regulatory agency report (e.g., Suspicious Activity Report (SAR), Currency Transaction Report (CTR)) for submission by the gaming establishment to the regulatory body. In another such embodiment, the system electronically submits the generated reports to the appropriate regulatory body. In another embodiment, the system denies any automatic approval of an attempted transfer due to the indirect transfer at least reaching a regulatory and/or operational control limit, and the system requires manual approval by gaming establishment personnel (and/or personnel of one or more financial institutions involved in the transfer transaction).

In various embodiments, in addition to offering indirect transfers between a gaming establishment account and an external account, the system enables the gaming establishment account to be funded from one or more sources. In certain embodiments, the system enables the gaming establishment account to be directly funded from one or more of such sources. In certain embodiments, the system enables the gaming establishment account to be funded from one or more of such sources, such as by an amount of funds from such sources first being transferred to another gaming establishment account and then such an amount of funds being transferred from the other gaming establishment account to the gaming establishment account.

In certain embodiments, the gaming establishment account is associated with a gaming establishment or a group of gaming establishments, wherein the user establishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be appreciated that the electronic fund data transfers of the present disclosure may occur in addition to or as an alternative from cash-based fund transfers and/or ticket voucher-based fund transfers. It should be further appreciated that any functionality or process of the present disclosure may be implemented via one or more servers (associated with or independent of any component of any system disclosed herein), one or more non-gaming establishment devices (e.g., a point-of-sale terminal of a retailer located external to and independent of a gaming establishment), a mobile device application, one or more gaming establishment devices (e.g., a gaming device such as an EGM or a non-gaming device such as a point-of-sale terminal of a retailer located within or otherwise associated with a gaming establishment), and/or one or more components of a gaming establishment system (such as a component of a gaming establishment management system supported by or otherwise located inside a gaming establishment device and/or a non-gaming establishment device). Accordingly: (i) while certain functions, features or processes are described herein as being performed by a non-gaming establishment device, such functions, features or processes may alternatively be performed by one or more servers, or one or more mobile device applications, one or more gaming establishment devices, and/or one or more gaming establishment components, and (ii) while certain functions, features or processes are described herein as being performed by one or more servers (e.g., a server of a gaming establishment fund management system, a server of a gaming establishment patron management system, a server of a financial institution that maintains an external account associated with a debit card, and/or a server of a financial institution that maintains a backing financial institution account associated with the gaming establishment fund management system), such functions, features or processes may alternatively be performed by one or more gaming establishment devices, one or more components of a gaming establishment system, one or more non-gaming establishment devices, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a financial institution that maintains an external account associated with a debit card; one or more components of a financial institution that maintains a backing financial institution account associated with a gaming establishment fund management system; zero, one or more components of a gaming establishment patron management system; zero, and/or zero, one or more gaming establishment devices. In these embodiments, such components of the gaming establishment fund management system, the financial institution that maintains the external account associated with the debit card, the financial institution that maintains the backing financial institution account associated with the gaming establishment fund management system, the gaming establishment patron management system, and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device; (3) accessing memory to configure or reconfigure parameters in the memory according to indicia read from the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device, while in other embodiments, at least one component of the controller resides outside of the housing of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device disclosed herein. In certain embodiments, the at least one memory device resides within the housing of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device, while in other embodiments at least one component of the at least one memory device resides outside of the housing of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device; (2) associations between configuration indicia read from the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to control the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device loads the new device driver from the at least one memory device to enable communication with the new device. For instance, one type of card reader in the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In various embodiments, the display devices serve as digital glass configured to aspects of the gaming establishment in which the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device is located. In various embodiments, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device receives an actuation, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In certain embodiments, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device displays a sequence of audio and/or visual attraction messages during idle periods to attract potential users to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. The videos may be customized to provide any appropriate information.

The at least one input device may include any suitable device that enables an input signal to be produced and received by the at least one processor of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In one embodiment, the at least one input device includes a payment device configured to communicate with the at least one processor of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to fund the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to be funded via an electronic funds transfer, such as a transfer of funds from a bank account. In another embodiment, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. When the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device operator to, when actuated, cause the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to perform particular functions. For instance, such buttons may be hard keys, programmable soft keys, or icons icon displayed on a display device of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device that are actuatable via a touch screen of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device or via use of a suitable input device of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device, such as one or more rechargeable power sources (e.g., rechargeable batteries) located at the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

The at least one data preservation component is configured to detect or sense one or more events and/or conditions that, for example, may result in damage to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device and/or that may result in loss of information associated with the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. For example, in one implementation, the at least one geolocation module is configured to receive GPS signal information for use in determining the position or location of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. In another implementation, the at least one geolocation module is configured to receive multiple wireless signals from multiple remote devices (e.g., the component of the gaming establishment fund management system, the gaming establishment patron management system, the component of the financial institution that maintains the external account associated with the debit card, the component of the financial institution that maintains the backing financial institution account associated with the gaming establishment fund management system and/or the gaming establishment devices, servers, wireless access points, etc.) and use the signal information to compute position/location information relating to the position or location of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

The at least one user identification module is configured to determine the identity of the current user or current owner of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device. For example, in one embodiment, the current user is required to perform a login process at the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device in order to access one or more features. Alternatively, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device is configured to automatically determine the identity of the current user based on one or more external signals, such as an RFID tag or badge worn by the current user and that provides a wireless signal to the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device that is used to determine the identity of the current user. In at least one embodiment, various security features are incorporated into the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

In various embodiments, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device includes a plurality of communication ports configured to enable the at least one processor of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device has a support structure, housing, or cabinet that provides support for a plurality of the input devices and the output devices of the component of the gaming establishment fund management system, the component of the gaming establishment patron management system, the component of the financial institution that maintains the external account associated with the debit card, the component of the financial institution that maintains the backing financial institution account associated with the gaming establishment fund management system and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
   a processor, and
   a memory device that stores a plurality of instructions that, when executed by the processor responsive to a debit card initiated request to transfer an amount of funds to a gaming establishment account from an external account associated with a debit card, cause the processor to:

communicate, to a first server of a first financial institution, data associated with the amount of funds and data associated with the external account, wherein the external account is maintained in association with the first financial institution independent of any gaming establishment, and responsive to the first server of the first financial institution communicating an approval of the debit card initiated request to a second server of a second financial institution that maintains a backing financial institution account associated with a gaming establishment, cause a transfer of the amount of funds from the backing financial institution account associated with the gaming establishment to the gaming establishment account.

2. The system of claim 1, wherein the backing financial institution account associated with the gaming establishment comprises an aggregate account of funds associated with a plurality of different users.

3. The system of claim 2, wherein the memory device stores a plurality of further instructions that, when executed by the processor responsive to the debit card initiated request, cause the processor to communicate, to the first server of the first financial institution, data associated with an identity of a user of the plurality of different users that is associated with the gaming establishment account.

4. The system of claim 2, wherein the memory device stores a plurality of further instructions that, when executed by the processor responsive to the debit card initiated request, cause the processor to communicate, to the first server of the first financial institution, data associated with the gaming establishment account.

5. The system of claim 1, wherein responsive to an occurrence of a settlement event, the amount of funds are transferred from the external account to the backing financial institution account associated with the gaming establishment.

6. The system of claim 5, wherein the settlement event occurs in association with the first server of the first financial institution approving the debit card initiated request.

7. The system of claim 1, wherein the transfer of the amount of funds from the backing financial institution account associated with the gaming establishment to the gaming establishment account occurs in association with a determination that the debit card initiated request complies with an anti-money laundering security measure.

8. The system of claim 1, wherein the debit card comprises a prepaid debit card.

9. The system of claim 1, wherein the gaming establishment account comprises a cashless wagering account.

10. A system comprising:
a processor; and
a memory device that stores a plurality of instructions that, when executed by the processor responsive to a debit card initiated request to transfer an amount of funds to a gaming establishment account from an external account associated with a debit card and an approval of the request, cause the processor to increase, based on the amount of funds, a balance of the gaming establishment account following an indirect transfer associated with a modification of a balance of a backing financial institution account associated with a gaming establishment, wherein following an occurrence of a settlement event and in association with a decrease of a balance of the external account, the balance of the backing financial institution account associated with the gaming establishment is increased.

11. The system of claim 10, wherein the gaming establishment account comprises a cashless wagering account.

12. A method of operating a system, the method comprising:
responsive to a debit card initiated request to transfer an amount of funds to a gaming establishment account from an external account associated with a debit card:
causing, by a processor, a communication to a first server of a first financial institution of data associated with the amount of funds and of data associated with the external account, wherein the external account is maintained in association with the first financial institution independent of any gaming establishment, and responsive to the first server of the first financial institution communicating an approval of the debit card initiated request to a second server of a second financial institution that maintains a backing financial institution account associated with a gaming establishment, causing a transfer of the amount of funds from the backing financial institution account associated with the gaming establishment to the gaming establishment account.

13. The method of claim 12, wherein the backing financial institution account associated with the gaming establishment comprises an aggregate account of funds associated with a plurality of different users.

14. The method of claim 13, further comprising, responsive to the debit card initiated request, causing, by the processor, a communication to the first server of the first financial institution of data associated with an identity of a user of the plurality of different users that is associated with the gaming establishment account.

15. The method of claim 13, further comprising, responsive to the debit card initiated request, causing, by the processor, a communication to the first server of the first financial institution of data associated with the gaming establishment account.

16. The method of claim 12, wherein responsive to an occurrence of a settlement event, the amount of funds are transferred from the external account to the backing financial institution account associated with the gaming establishment.

17. The method of claim 16, wherein the settlement event occurs in association with the first server of the first financial institution approving the debit card initiated request.

18. The method of claim 12, wherein the transfer of the amount of funds from the backing financial institution account associated with the gaming establishment to the gaming establishment account occurs in association with a determination that the debit card initiated request complies with an anti-money laundering security measure.

19. The method of claim 12, wherein the debit card comprises a prepaid debit card.

20. The method of claim 12, wherein the gaming establishment account comprises a cashless wagering account.

* * * * *